US010576892B2

(12) United States Patent
Haggerty et al.

(10) Patent No.: US 10,576,892 B2
(45) Date of Patent: Mar. 3, 2020

(54) SYSTEM AND METHOD FOR GENERATING A HYBRID CAMERA VIEW IN A VEHICLE

(71) Applicant: Ford Global Technologies, LLC, Dearborn, MI (US)

(72) Inventors: Terry Haggerty, Plymouth, MI (US); Brad Alan Ignaczak, Canton, MI (US); Jonathan Diedrich, Carleton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 210 days.

(21) Appl. No.: 15/080,148

(22) Filed: Mar. 24, 2016

(65) Prior Publication Data

US 2017/0274822 A1   Sep. 28, 2017

(51) Int. Cl.
*B60R 1/00* (2006.01)

(52) U.S. Cl.
CPC .......... *B60R 1/00* (2013.01); *B60R 2300/102* (2013.01); *B60R 2300/105* (2013.01); *B60R 2300/303* (2013.01); *B60R 2300/806* (2013.01)

(58) Field of Classification Search
CPC ................ B60R 1/00; B60R 2300/102; B60R 2300/105; B60R 2300/303; B60R 2300/806
USPC ......................................................... 348/148
See application file for complete search history.

(56) References Cited

U.S. PATENT DOCUMENTS

| 8,816,637 | B2 | 8/2014 | Martin et al. |
| 8,823,551 | B1 | 9/2014 | Hoffman |
| 9,226,004 | B1 * | 12/2015 | Plante .............. H04N 21/23406 |
| 2003/0108222 | A1 | 6/2003 | Sato et al. |

(Continued)

FOREIGN PATENT DOCUMENTS

| CN | 2365843 Y | 2/2000 |
| DE | 102007016055 A1 | 5/2008 |

(Continued)

OTHER PUBLICATIONS

Search Report dated Sep. 7, 2017 for GB Patent Application No. GB 1704326.6 (4 pages).
Bill Howard, What are car surround view cameras, and why are they better than they need to be?, ExtremeTech.com, Jul. 18, 2014, 11 pages, retrieved Dec. 25, 2015 from http://www.extremetech.com/extreme/186160-what-are-surround-view-cameras-and-why-are-they-better-than-they-need-to-be.

*Primary Examiner* — Christopher G Findley
(74) *Attorney, Agent, or Firm* — Frank Lollo; Eversheds Sutherland (US) LLP (57) ABSTRACT

Embodiments include a vehicle comprising a plurality of cameras for capturing images within a field of view surrounding the vehicle; a processor for generating a real-time view of an area within the field of view using currently-captured images, and a time-delayed view of a region outside the field of view using previously-captured images stored in a memory; and a display for displaying a hybrid view comprising the real-time view and time-delayed view. Embodiments also include a vehicle camera system comprising a plurality of cameras configured to capture images within a field of view surrounding the vehicle, and a processor configured to generate a real-time view of an area within the field of view using currently-captured images, a time-delayed view of a region outside the field of view using previously-captured images stored in a memory, and a hybrid view of the vehicle by integrating the time-delayed view into the real-time view.

22 Claims, 4 Drawing Sheets

(56) References Cited

U.S. PATENT DOCUMENTS

| | | | |
|---|---|---|---|
| 2008/0012940 A1* | 1/2008 | Kanaoka | H04N 5/272 348/148 |
| 2008/0129539 A1 | 6/2008 | Kumon | |
| 2010/0201818 A1 | 8/2010 | Imanishi et al. | |
| 2011/0063444 A1* | 3/2011 | Okamoto | B60R 1/00 348/148 |
| 2012/0044327 A1* | 2/2012 | Horita | G01C 11/06 348/47 |
| 2012/0095617 A1 | 4/2012 | Martin | |
| 2012/0262002 A1 | 10/2012 | Widmer et al. | |
| 2012/0269382 A1* | 10/2012 | Kiyohara | G01C 21/26 382/103 |
| 2012/0327239 A1 | 12/2012 | Inoue et al. | |
| 2013/0024059 A1 | 1/2013 | Miller et al. | |
| 2014/0132208 A1 | 5/2014 | Fisher | |
| 2014/0217966 A1 | 8/2014 | Schneider et al. | |
| 2014/0232331 A1 | 8/2014 | Stamenic et al. | |
| 2015/0116495 A1 | 4/2015 | Kowatari et al. | |
| 2015/0168309 A1 | 6/2015 | Goethel | |
| 2017/0132476 A1* | 5/2017 | Chien | G06K 9/00791 |
| 2017/0174129 A1 | 6/2017 | Chin et al. | |

FOREIGN PATENT DOCUMENTS

| | | |
|---|---|---|
| JP | 2003244688 A | 8/2003 |
| WO | WO 2014082571 A1 | 6/2014 |
| WO | WO 2015114775 A1 | 8/2015 |
| WO | WO 2015152691 A2 | 10/2015 |
| WO | WO 2015152692 A1 | 10/2015 |

* cited by examiner

SYSTEM AND METHOD FOR GENERATING A HYBRID CAMERA VIEW IN A VEHICLE

TECHNICAL FIELD

This application generally relates to vehicle camera systems, and more specifically, to generating a hybrid camera view that includes the vehicle surroundings within a field of view of the camera system and areas outside the field of view.

BACKGROUND

Existing surround-view or 360° view camera systems gather images captured by cameras positioned at various locations around the vehicle and generate a live view of the vehicle's surroundings that is displayed on a vehicle display for the vehicle operator to see. These systems may apply image processing techniques to the images captured by each camera at a given point in time to generate the live view. For example, the image processing techniques may include image registration or other techniques for identifying common features between the camera images, aligning the images according to the common features, and combining or stitching the images together to create a panoramic view of the vehicle's surroundings. Existing image processing techniques also include reducing image distortion, overlaying information onto the images, and/or equalizing image characteristics, such as brightness or contrast, to create a more homogeneous panoramic image.

Existing vehicle camera systems also use image processing to change a perspective of the captured images before and/or after combining the images to create a panoramic or surround-view image, and before displaying the resulting image on the vehicle display as part of a live video feed of the vehicle's surroundings. For example, each of the cameras may be positioned on the vehicle to capture images corresponding to a specific field of view relative to the vehicle, such as, e.g., a front view, a left side view, a right side view, and a rear view. Image processing techniques may be used to transform the perspective of the images captured by each camera into, for example, a top view or a top-down view.

Figure 1A:
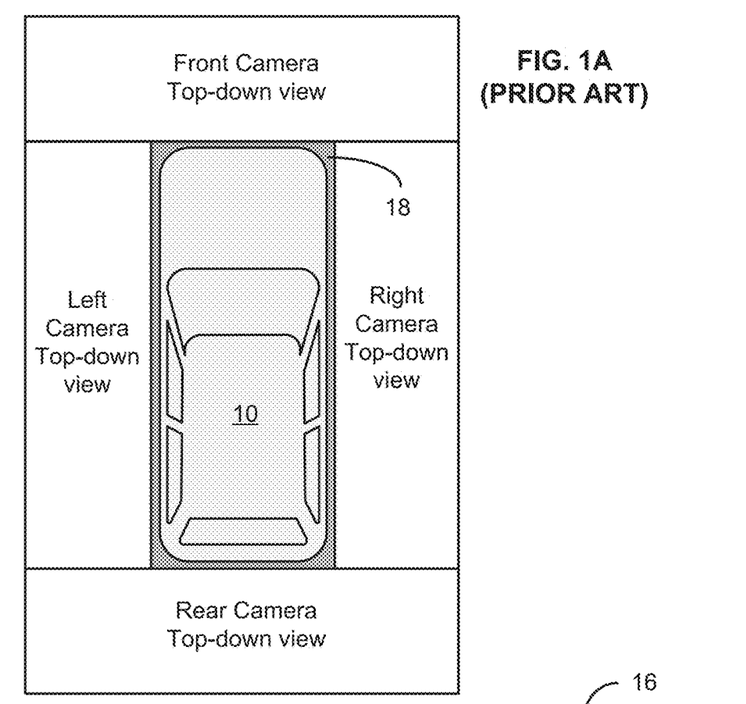
FIG. 1A is an illustration defining a current field of view for an existing vehicle camera system.

For example, FIG. 1A depicts areas surrounding a conventional vehicle 10 that are within a current field of view of an existing 360° view camera system. The camera system may include at least a front camera, a left camera, a right camera, and a rear camera, and each camera may be positioned on the vehicle 10 to capture image data of the vehicle surroundings from a corresponding field of view (e.g., front, left, right, and rear views, respectively). The vehicle camera system may be configured to change a perspective of, and/or apply other image processing techniques to, the images captured by each camera to obtain a corresponding top-down view of the area within the field of view of that camera, such as the front camera top-down view, left camera top-down view, right camera top-down view, and rear-camera top-down view shown in FIG. 1A.

Figure 1B:
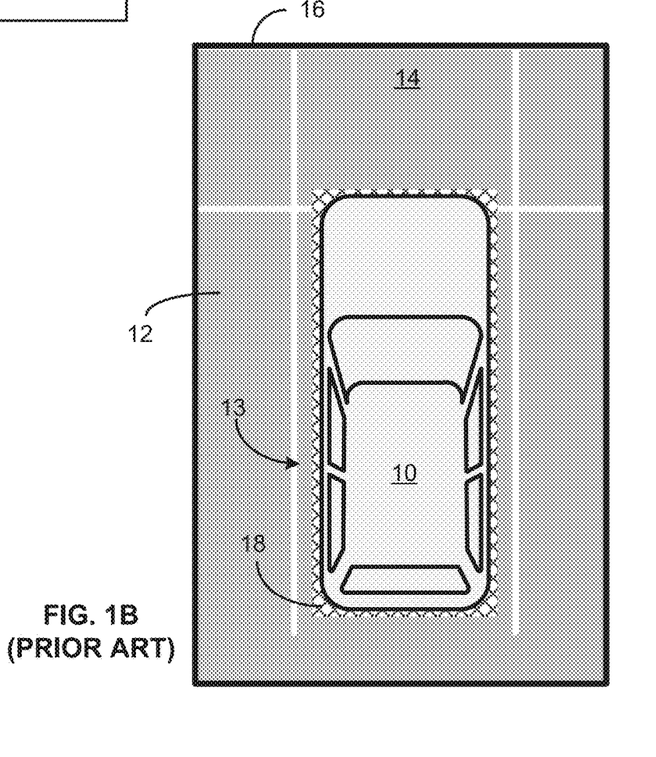
FIG. 1B is an illustration of exemplary image data captured within the field of view shown in FIG. 1A by the existing vehicle camera system.

To illustrate, FIG. 1B shows an exemplary top-down image 12 of the vehicle 10 parked in a parking space 13 within a parking lot 14, the image 12 being displayed on a vehicle display 16. The top-down image 12 may be generated by the existing 360° view camera system using image data captured from the front, left, right, and rear cameras on the vehicle 10 and applying the above-described image processing techniques. In particular, the front camera image data can be transformed into images representing a top-down view of a parking lot area that is within a field of view of the front camera, the left camera image data can be transformed into images representing a top-down view of a parking lot area that is within a field of view of the left camera, the right camera image data can be transformed into images representing a top-down view of a parking lot area that is within a field of view of the right camera, and the rear camera image data can be transformed into images representing a top-down view of a parking lot area that is within a field of view of the rear camera.

One drawback of existing 360° view camera systems is that the resulting surround-view images, or the live video feed comprised thereof, are limited to the image data captured within the current field of view of the vehicle cameras. For example, in FIG. 1A, the gray-shaded area represents a region 18 underneath and closely surrounding the vehicle 10 that is excluded from, or outside of, the current field of view. That is, the current field of view for each of the vehicle cameras does not include any portion of the region 18 shown in FIG. 1A. As a result, existing camera systems do not have the ability to present image data representing the region 18, or other regions outside the system's current field of view, and may depict these regions as unidentifiable, gray areas within the surround-view image 12, as shown in FIG. 1B.

Accordingly, there is still a need in the art for vehicle camera systems and methods that can provide image data or other information about one or more regions that are outside a current field of view of the vehicle cameras.

SUMMARY

The invention is intended to solve the above-noted and other problems by providing systems and methods configured to generate a hybrid camera view of a vehicle's surroundings that includes a live video or real-time view of areas within a current field of view of the vehicle's cameras and a supplemental or time-delayed view representing regions adjacent to or outside the current field of view of the vehicle cameras, the supplemental view being generated using stored image data previously-captured by the vehicle cameras.

For example, one embodiment provides a vehicle comprising a plurality of cameras for capturing images within a field of view surrounding the vehicle; a processor for generating a real-time view of an area within the field of view using currently-captured images, and a time-delayed view of a region outside the field of view using previously-captured images stored in a memory; and a display for displaying a hybrid view comprising the real-time view and the time-delayed view.

Another example embodiment provides a method comprising retrieving, from a memory, stored images showing areas surrounding a vehicle; generating, by a processor, a time-delayed view of a surface underneath the vehicle based on the retrieved images; combining, by the processor, the time-delayed view with real-time images captured by cameras positioned around the vehicle to form a hybrid view of the vehicle; and providing the hybrid view to a vehicle display for display thereon.

Yet another example embodiment provides a vehicle camera system comprising a plurality of cameras configured to capture images within a field of view surrounding the vehicle, and a processor configured to generate a real-time view of an area within the field of view using currently-captured images, a time-delayed view of a region outside the field of view using previously-captured images stored in a memory, and a hybrid view of the vehicle by integrating the time-delayed view into the real-time view.

As will be appreciated, this disclosure is defined by the appended claims. The description summarizes aspects of the embodiments and should not be used to limit the claims. Other implementations are contemplated in accordance with the techniques described herein, as will be apparent to one having ordinary skill in the art upon examination of the following drawings and detail description, and such implementations are intended to within the scope of this application.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects.

Systems and methods are provided herein for generating a hybrid camera view of a vehicle and its surroundings, including areas underneath the vehicle, using a vehicle camera system in accordance with embodiments. The vehicle camera system (such as, e.g., vehicle camera system 402 shown in FIG. 4) may include a plurality of cameras positioned at various locations on the vehicle to capture different views relative to the vehicle. For example, the vehicle camera system may include a front view camera, a rear view camera, a left view camera, and a right view camera (such as, e.g., cameras 404-410 shown in FIG. 4). The views captured by the vehicle cameras at a given point in time may collectively form a current field of view for the vehicle camera system and may be displayed on a vehicle display as part of a live video feed of the vehicle's surroundings. As shown in FIG. 1A, an area underneath and closely surrounding, or immediately adjacent to, the vehicle (i.e. the region 18) may be excluded from or outside the current field of view of a conventional camera system due to, for example, an angle and/or position of each vehicle camera and/or other limitations of the camera system. According to embodiments, the hybrid camera view described herein supplements the live video feed of the vehicle's surroundings with stored image data representing at least one area outside the current field of view of the vehicle camera system, thereby providing a vehicle operator with a more complete picture of a vicinity of the vehicle.

Figure 2:
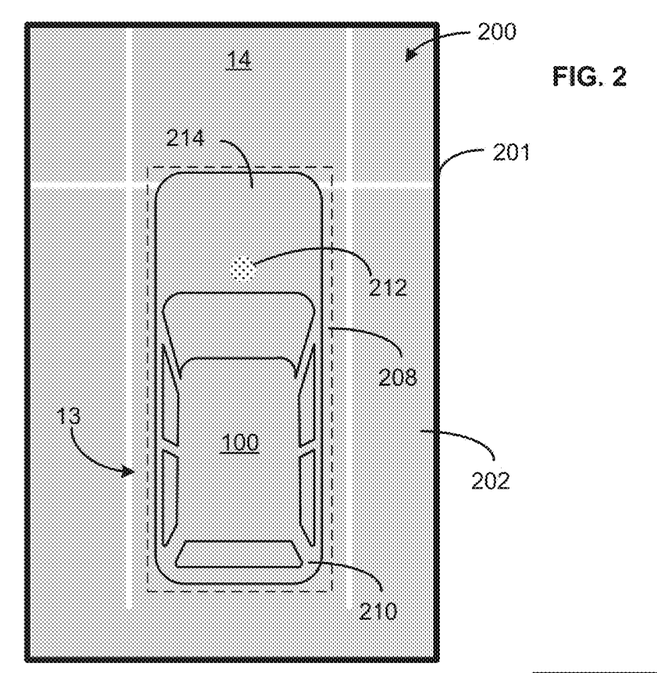
FIG. 2 is an illustration of exemplary image data representing a hybrid camera view generated using first image processing techniques in accordance with certain embodiments.

More specifically, FIG. 2 illustrates an exemplary hybrid camera view 200 that may be generated by a processor (such as, e.g., processor 412 shown in FIG. 4) in accordance with the techniques discussed herein. Like the image 12 shown in FIG. 1B, the hybrid camera view 200 shows a vehicle 100 parked in the parking space 13 within the parking lot 14, and the hybrid camera view 200 is displayed on a vehicle display 201 for presentation to a vehicle operator. However, as shown in FIG. 2, the hybrid camera view 200 simultaneously presents, within one view, (i) a real-time view 202 comprising image data corresponding to areas within a current field of view of the vehicle camera system, such as, e.g., a conventional live video feed; and (ii) a supplemental or time-delayed view 208 comprising stored image data corresponding to one or more regions adjacent to and/or outside the current field of view of the vehicle camera system. For example, in FIG. 2, the real-time view 202 comprises live or captured image data representing the parking lot areas that are surrounding the vehicle 100 (e.g., on the front, left, right, and rear sides) and within the current field of view, and the supplemental view 208 comprises stored image data representing an area of the parking lot 104 that is largely underneath the vehicle 100 and is not captured by the real-time view 202.

In embodiments, the real-time view 202 can constitute a live video feed that is generated by combining or stitching together, in real-time or near real-time, images currently captured by the vehicle cameras (also referred to herein as "currently-captured images"). The processor can be configured to use various image processing techniques to generate the real-time view 202, such as, for example, image registration, rectification, translation, and rotation. In embodiments, each image captured by the vehicle cameras can include a time component, such as, for example, a timestamp, in addition to image data. Image registration techniques can be used to process the captured images and map each pixel within the image data to a corresponding position in a three-dimensional (3D) space, where the third dimension is time and the pixels are assigned coordinates within the remaining two dimensions. The pixel registrations can be used to identify the images that were captured at the same time by the front, left, right, and rear cameras and to match up or align these images along common features or pixels. In some cases, the real-time view 202 can be generated by stitching the aligned images together to create a panoramic image or the like.

In embodiments, images captured by the vehicle cameras can be periodically stored in a memory (such as, e.g., data storage device 414 shown in FIG. 4) for future retrieval and processing. The rate at which the currently-captured images are stored and/or the number of images that are stored in the memory can be adjusted based on, for example, a speed of the vehicle 100, a direction of travel of the vehicle 100, a current field of view of the vehicle camera system, an amount of memory available, and/or other relevant factors. In some cases, the image data may be temporarily stored in the memory for a predetermined amount of time before being deleted, in order to create space for newly-captured image data. Each image may be stored in association with its time component and/or pixel registration for use in future image processing.

According to embodiments, the supplemental view 208 can be generated by combining portions of previously-captured images that stored in the memory and show the areas outside the current field of view. For example, in many situations, the vehicle cameras will have captured an area currently underneath the vehicle 100 in the moments prior to the vehicle 100 reaching that area. In the case of FIG. 2, for example, the vehicle cameras may capture images of the region 108 as the vehicle 100 approaches and turns into the parking space 13. The supplemental view 208 can be generated by collecting or storing these images in the memory and combining, or stitching together, relevant portions of the previously-captured image data to create a representation of the area that is now outside the current field of view of the vehicle cameras. For example, using the pixel registrations for each image, the processor can identify certain features or pixels in each of the stored images that show the road surface underneath the vehicle 100 or other portion of the region 108, align the identified images along common features, and combine the aligned images to create the supplemental view 208.

In embodiments, the processor can be configured to spatially rectify the previously-captured images stored in the memory with the live image data being currently captured by the vehicle cameras and displayed on the vehicle display 201, in order to create a cohesive virtual view of the road below the vehicle 100, as shown by the supplemental view 208 in FIG. 2. In embodiments, vehicle dynamic sensors (such as, e.g., vehicle dynamic sensors 416 shown in FIG. 4) can be used to track the vehicle's current movement status (e.g., yaw rate, longitudinal and lateral acceleration, etc.) and calibrate the vehicle camera system accordingly. The stored images used to generate the supplemental view 208 can be appropriately translated and rotated based on the vehicle's current movement status, so that the supplemental view 208 and/or the road surface shown therein is displayed on the vehicle display 201 in a correct position relative to a current position of the vehicle 100 and a current orientation of the real-time view 202. For example, stored images of the region 18 may have been previously captured as the vehicle 100 was turning into the parking space 13 and therefore, may have captured the road surface within region 18 at an angle. But in FIG. 2, the vehicle 100 is currently parked parallel to, and directly over, the parking space 13. Accordingly, when generating the supplemental view 208, the corresponding stored images may need to be calibrated (e.g., translated, rotated, etc.) to match the vehicle's current position.

Given that stored image data is needed to create the supplemental view 208, the supplemental view 208 must be at least somewhat time-delayed as compared to the real-time view 202 being simultaneously displayed on the vehicle display 201. A certain amount of time delay may also be introduced depending on a speed of the vehicle 100, if traveling, as well as other factors, such as, for example, the processing speeds for the memory, processor, cameras, and display, the type and sophistication of the image processing techniques, and other considerations, as will be appreciated.

In embodiments, the supplemental view 208 can be continuously or periodically updated, for example, as newly-captured image data is stored in the memory and/or as the vehicle 100 moves to a new location, so as to keep the supplemental view 208 as close to real-time as possible. For example, once the currently-captured image data is stored in the memory as new previously-captured image data, the processor can generate an updated version of the time-delayed view 208 using the newly-stored images, and the updated time-delayed view can be presented on the vehicle display 201 in place of the time-delayed view 208 currently on display. Depending on available processing speeds, the supplemental view 208 can be generated using image data that was captured by the vehicle cameras just prior to the images shown in the real-time view 202. In embodiments, the processor can be configured to independently update the two portions of the hybrid camera view 200, so that the real-time view 202 can be updated in real-time while the supplemental view 208 continues to receive time-delayed content as described herein.

In some cases, the supplemental view 208 may not be available until sufficient image data has been stored in the memory and/or the vehicle 100 begins to move. For example, when the vehicle and/or the camera system is first turned on, there may be no image data stored in the memory because the vehicle cameras have not yet captured any images. In addition, for the purpose of creating a time-delayed view of, for example, the road surface underneath the vehicle 100, the vehicle camera system will not have image data corresponding to this region until the vehicle 100 moves to a new location. As a result, the supplemental view 208 may not be available when first starting the camera system and until the vehicle 100 starts to move. In such cases, the hybrid camera view 200 may briefly include a blank image in the space reserved for the supplemental view 208. Once the vehicle 100 starts to move and the vehicle cameras starts to capture images, the memory will begin receiving currently-captured images for storage. Upon storing these images in the memory, the processor can begin forming the supplemental view 208.

In embodiments, the supplemental view 208 can be configured as a "glass-bottom" view that provides a virtual view of the road surface underneath the vehicle 100. For example, an at least partially transparent image 210 of the vehicle 100 can overlay the image data shown in the supplemental view 208, so that the road surface underneath the vehicle 100, and any objects located thereon, can be seen through the vehicle image 210. In FIG. 2, the glass-bottom supplemental view 208 reveals an object 212 (e.g., a charging coil) on the ground underneath a hood area of the vehicle 100 and that a front end of the vehicle 100 has crossed over a parking line 214. In some embodiments, the hybrid camera view 200 can be used by the vehicle operator to help precisely position the vehicle 100 over a wireless vehicle charging coil or other structure under the vehicle 100 and/or align the vehicle 100 within a demarcated parking space. The vehicle image 210 can be pre-selected to be the same or similar make, model, and/or color as the vehicle 100. In some cases, the vehicle image 210 can be comprised of one or more photographs of the vehicle 100 or a similar vehicle.

In embodiments, the hybrid camera view 200 can be generated by integrating the supplemental view 208 into the real-time view 202. For example, the real-time view 202 can include a blank space, a gray-shaded area, or other markings to represent an unidentifiable region that is outside the current field of view of the vehicle camera system, for example, as shown by the region 18 depicted in FIG. 1B. The blank space may be displayed on the vehicle display 201 initially, for example, when the vehicle display 201 is first turned on and before the image data captured by the vehicle camera system has been stored in the memory. Once the memory has enough stored images to create a representation of the region 18, the processor can replace the blank space of the real-time view 202 with the supplemental view 208, thereby creating the hybrid camera view 200.

According to embodiments, the processor can be configured to use image registration and/or other image processing techniques to align the edges of the supplemental view 208 with the edges of the real-time view 202, so that the hybrid camera view 200 provides a visually cohesive image of the vehicle's surroundings, as shown in FIG. 2. For example, to create the hybrid camera view 200, the processor can be configured to use feature detection, matching, and alignment techniques to identify the edges of the real-time view 202; using the currently-captured images in the real-time view 202 as a reference, identify certain features of the previously-captured images in the supplemental view 208 that match the features appearing at the edges of the currently-captured images; and align the previously-captured images with the currently-captured images along these matching features in order to integrate the supplemental view 208 into the blank space of the real-time view 202.

In FIG. 2, the hybrid camera view 200 shows a top-down perspective of the vehicle 100. Image processing techniques may be used to transform an original perspective of the supplemental view 208 and the real-time view 202, or the images included therein, into the illustrated top-down view, as needed. In other cases, the hybrid camera view 200 may be presented from a different viewpoint, such as, for example, a bird's eye view, a bird's eye shot view, or any other top view that looks down on the vehicle or is otherwise altered from the original. In one embodiment, the hybrid camera view 200 may be configured to show a three-dimensional view of the vehicle 100 such that the camera appears to be positioned above the vehicle 100 (e.g., 10 feet high) and off to one side of the vehicle 100 (e.g., from the back left or right corner). In some cases, the processor may also use rectification techniques to flattening the images used to create the hybrid camera view 200 in order to achieve a desired perspective, such as, for example, a two-dimensional top-down view.

In FIG. 2, the supplemental view 208 is outlined in phantom only for the sake of illustration. That is, in the illustrated embodiment, the hybrid camera view 200 may contain no demarcation between the supplemental view 208 and the real-time view 202, so that the two appear to be forming one cohesive image. In other embodiments, the supplemental view 208 may be presented with one or more differentiating characteristics to visually distinguish the time-delayed, supplemental view 208 from the real-time view 202. In some cases, the differentiating characteristic can be slight, such as an outline, like the phantom line in FIG. 2, for indicating an outer edge or border of the supplemental view 208. In other cases, the entire region corresponding to the supplemental view 208 may have a differentiating characteristic.

Figure 3:
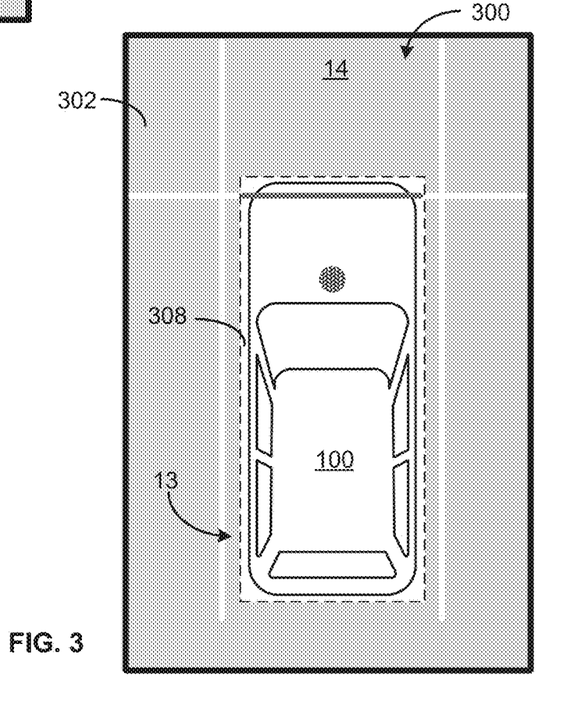
FIG. 3 is an illustration of exemplary image data representing a hybrid camera view generated using second image processing techniques in accordance with certain embodiments.

For example, the recorded images included in the supplemental view 208 can be display in black and white, while the live images included in the real-time view 202 can be displayed in color. As another example, the supplemental view 208 can be displayed with different image processing techniques, such as edge detection, to differentiate the time-delayed region from the real-time view 202. FIG. 3 illustrates an example hybrid camera view 300 that differentiates between a real-time view 302 and a supplemental view 308 by displaying the supplemental view 308 with inverted colors as compared to the real-time view 302 (e.g., dark colors become light and light colors become dark, etc.). Other techniques for visually distinguishing between the real-time view 202 and the supplemental view 208 within the same hybrid camera view 200 are also contemplated.

Figure 4:
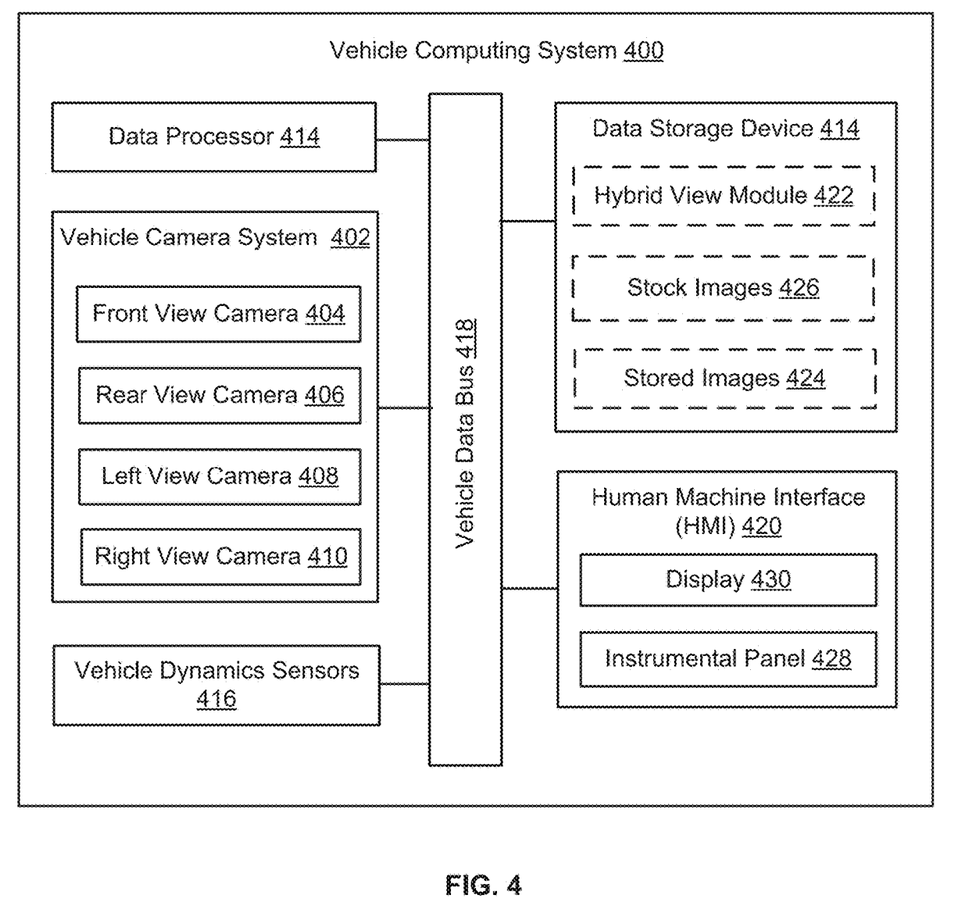
FIG. 4 is a block diagram showing an exemplary vehicle computing system for generating the hybrid camera views of FIGS. 2 and/or 3, in accordance with certain embodiments.

FIG. 4 illustrates an exemplary vehicle computing system (VCS) 400 configured to generate a hybrid camera view, such as hybrid camera view 200 and/or 300, in accordance with embodiments. The VCS 400 may be included in any type of vehicle, including, for example, the vehicle 100 shown in FIG. 2. In embodiments, the vehicle computing system 400 may be part of a vehicle electronics system or an infotainment system of the vehicle 100, such as the SYNC® system manufactured by FORD MOTOR COMPANY®. Other embodiments of the VCS 400 can include different, fewer, or additional components than those described below and shown in FIG. 4.

As shown, the vehicle computing system 400 may comprise a vehicle camera system 402. The vehicle camera system 402 includes a plurality of cameras, including a front view camera 404, a rear view camera 406, a left view camera 408, and a right view camera 410. The plurality of cameras may be respectively positioned at front, rear, left, and right sides of, for example, the vehicle 100 in order to capture the field of view shown in FIG. 1A.

As shown, the VCS 400 also includes a data processor 412, a data storage device 414, vehicle dynamic sensors 416, and a vehicle data bus 418. The VCS 400 can further include various electronic control units (ECUs) that are responsible for monitoring and controlling the electrical systems or subsystems of the vehicle 100. Each ECU may include, for example, one or more inputs and outputs for gathering, receiving, and/or transmitting data, a memory for storing the data, and a processor for processing the data and/or generating new information based thereon. In the illustrated embodiment, the ECUs of the VCS 400 include human-machine interface (HMI) 420, and in some cases, the vehicle camera system 402. Though not shown, the VCS 400 may include other ECUs, such as, for example, a restraint control module (RCM) for controlling and monitoring a restraint system of the vehicle 100, a powertrain control module (PCM) for controlling and monitoring engine and transmission systems of the vehicle 100, a telematics control unit (TCU) for enabling the vehicle 100 to connect to one or more wireless networks, and a body control module (BCM) for controlling and monitoring various electronic accessories in a body of the vehicle 100.

The ECUs of the VCS 400 are interconnected by the vehicle data bus 418 (such as, e.g., a controller area network (CAN) bus), which passes data to and from the various ECUs and other components of the VCS 400, such as the vehicle dynamic sensors 416, as well as other vehicle and/or auxiliary components in communication with the VCS 400. Further, the data processor 412 can communicate with any one of the ECUs, the sensors 416, and the data storage device 414 via the data bus 418 in order to carry out one or more functions, including the functions associated with a hybrid view module 422.

In some cases, the vehicle camera system 402 can be implemented as an electronic control unit (ECU) comprising a separate memory for storing the hybrid view module 422 and/or other program modules or software instructions for carrying out the image processing techniques described herein, and a separate processor for executing the instructions stored in the ECU memory. In other cases, the vehicle camera system 402 provides images 424 captured by the cameras 404-410 to the data processor 412 for processing in accordance with instructions stored in the data storage device 414, as shown in FIG. 4. In such cases, the hybrid view module 422 and the images 424 captured by the cameras 404-410 can be stored in the data storage device 414, as shown in FIG. 4. In embodiments, the data processor 412 may retrieve one or more of the stored images 424 from the data storage device 414 in order to generate the supplemental view 208 shown in FIG. 2, or otherwise carryout instructions included in the hybrid view module 422. In addition, the data storage device 414 may also store stock images 426 (such as, for example, the vehicle image 210 shown in FIG. 2) and/or other pre-configured images that may be used to generate the hybrid camera view 200.

The human-machine interface (HMI) 420 (also referred to as a "user interface") can be an ECU for enabling user interaction with the vehicle 100, for presenting vehicle information to the vehicle operator, and for displaying the hybrid camera view to the vehicle operator. The HMI 420 can comprise an instrument panel (IP) 428, media display screen 430 (such as, e.g., the vehicle display 201 shown in FIG. 2), as well as one or more input devices (not shown) and/or output devices (not shown) for inputting, entering, receiving, capturing, displaying, or outputting data associated with the vehicle computing system 400, the vehicle camera system 402, and/or the techniques disclosed herein. The HMI 420 can be configured to interact with the other ECUs of the VCS 400 and/or the data processor 412 via the data bus 418 in order to provide information or inputs received via the HMI 420 to an appropriate component of the VCS 400 and to present, to the vehicle operator, information or outputs received from the various components of the VCS 400, including the hybrid camera view for display on the media display screen 430 and/or the IP 428.

In embodiments, the instrument panel 428 (also referred to as a "dashboard" or "cluster") includes a control panel positioned in front of the driver's seat for housing instrumentation and controls for operation of the vehicle 100, including, for example, a steering wheel, various gauges (e.g., speedometer, odometer, fuel gauge, etc.), and various vehicle indicators, such as, for example, a selected position of a gear selector, seat belt warnings, low fuel, low tire pressure, etc. In some cases, the instrument panel 428 includes a display screen for electronically or digitally displaying the various gauges, or values related thereto, and the various vehicle indicators. In such cases, the hybrid camera view may be displayed on the display screen of the IP 428.

The media display screen 430 can be separate from the instrument panel 428 for displaying other vehicle information, such as, for example, navigation system information, audio system information, video and/or images currently captured by external vehicle cameras 404-410, image(s) captured by an in-vehicle camera (not shown), heating and air/conditioning information, etc. In embodiments, the VCS 400 may provide the hybrid camera view to the media display screen 430 for display thereon.

The vehicle dynamic sensors 416 can include any type of sensor for detecting, monitoring, and/or measuring a current movement of the vehicle 100. For example, in some embodiments, the vehicle dynamic sensors 416 can include wheel speed sensors, lateral acceleration sensors, longitudinal acceleration sensors, steering wheel sensors, steering angle sensors, and yaw rate sensors. The outputs of these sensors 416 can be provided to the processor 412 via the vehicle data bus 418. Based on the received outputs, the processor 412 can determine the vehicle's current movement status, including, for example, yaw rate, longitudinal and lateral acceleration, pitch and roll rates, etc. The vehicle's movement status can be used by the hybrid view module 422 to calibrate the hybrid camera view to the current position of the vehicle.

The hybrid view module 422 can comprise software instructions for generating the real-time view using live image data corresponding to areas currently surrounding the vehicle and within a current field of view of the cameras 404-410; for generating the supplemental or time-delayed view using stored, previously-captured image data corresponding to an area (e.g., road surface) underneath and/or closely surrounding the vehicle 100 and outside the current field of view (such as the region 18 shown in FIG. 1A); and for generating the hybrid camera view by combining the supplemental view with the real-time view. In addition, the hybrid view module 422 can comprise software instructions for updating the time-delayed view as newly-captured image data is stored in the memory; for providing the hybrid camera view to the HMI 420 for display to the vehicle operator, and for carrying out other functions associated with the hybrid camera view. In some cases, the hybrid view module 422 is a stand-alone module that can be added to an existing vehicle camera system to enable the existing system to generate the hybrid camera view. In other cases, the hybrid view module 422 can be configured as a new unit for replacing the existing software for processing and displaying captured image data.

The data processor 412 can comprise one or more of a microprocessor, a microcontroller, a programmable logic array, an application-specific integrated circuit, a logic device, or other electronic device for processing, inputting, outputting, manipulating, storing, or retrieving data. In embodiments, the data processor 412 can include a central processing unit (CPU) and/or a graphics processing unit (GPU). In some embodiments, the VCS 400 can comprise a general purpose computer that is programmed with various programming instructions or modules stored in the data storage device 414 (e.g., electronic memory), or elsewhere.

The data storage device 414 can comprise one or more of electronic memory, nonvolatile random access memory (e.g., RAM), flip-flops, a computer-writable or computer-readable storage medium, a magnetic or optical data storage device, a magnetic or optical disc drive, a hard disk drive, or other electronic device for storing, retrieving, reading, or writing data. The data storage device 414 stores one or more software program modules or software instructions, including the hybrid view module 422, for execution by the data processor 412.

Figure 5:
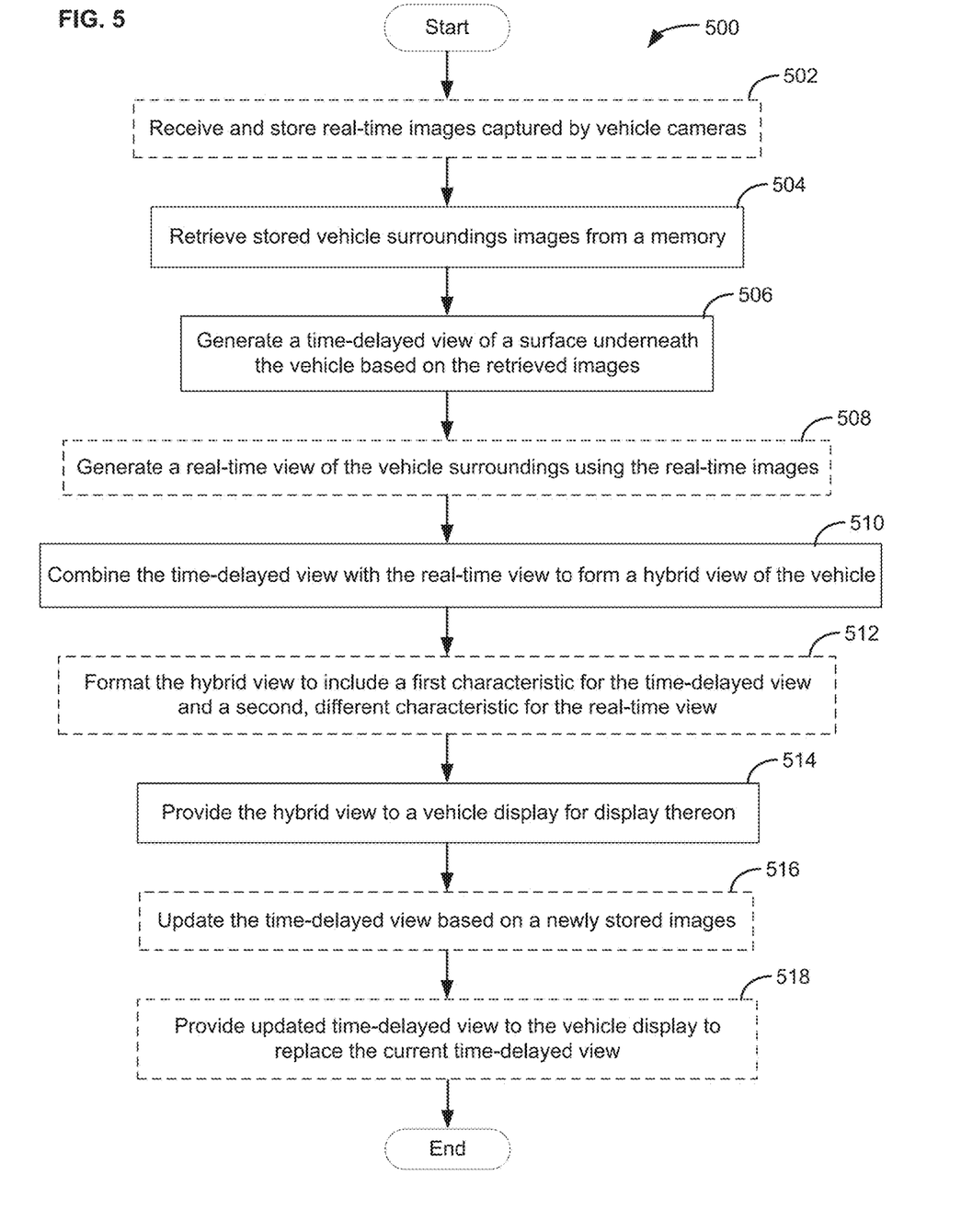
FIG. 5 is a flow diagram of an example method for providing the hybrid camera views of FIGS. 2 and/or 3, in accordance with certain embodiments.

FIG. 5 illustrates an example method 500 for generating a hybrid camera view of a vehicle and its surroundings, in accordance with embodiments. The method 500 can be carried out by one or more processors (or controllers) included in, for example, a vehicle computing system (such as, e.g., the vehicle computing system 400 shown in FIG. 4) and/or a vehicle camera system (such as, e.g., the vehicle camera system 402 shown in FIG. 4) coupled to a vehicle (such as, e.g., the vehicle 100 shown in FIG. 2). In one embodiment, the method 500 is implemented, at least in part, by the data processor 412 of the VCS 400 executing software stored in the data storage device 414, such as, e.g., the hybrid view module 422, and interacting with one or more components of the VCS 400 and/or the vehicle camera system 402 coupled thereto.

In some embodiments, the method 500 may begin at step 502, where the processor and/or the vehicle camera system receives and stores, in the memory, real-time or live images currently captured by cameras positioned around the vehicle (such as, e.g., vehicle cameras 404-410 shown in FIG. 4). In other embodiments, the method 500 may begin at step 504. At step 504, the processor and/or the vehicle camera system retrieves, from the memory, stored images showing areas surrounding the vehicle, including an area or road surface underneath the vehicle. The stored images can be previously-captured images, or images that were captured by the cameras at a point in time prior to capture of the real-time images received at step 502.

At step 506, the processor and/or vehicle camera system generates a time-delayed view (such as, e.g., the supplemental view 208 shown in FIG. 2) of a surface underneath the vehicle (such as, e.g., the region 108 shown in FIG. 1B) based on the retrieved images. For example, the surface underneath the vehicle may be outside a current field of view of the vehicle cameras, as shown in FIG. 1A. As a result, the real-time images received and stored in step 502 may not include image data representing the area underneath the vehicle.

In some embodiments, the method 500 further includes step 508, wherein the processor and/or vehicle camera system generates a real-time view (such as, e.g., the real-time view 202 shown in FIG. 2) of the areas surrounding the vehicle using the real-time images received and stored in step 502. For example, the real-time view may be generated by aligning and combining corresponding aspects of the real-time images. At step 510, the processor and/or the vehicle camera system combines the time-delayed view with the real-time view, or the real-time images included therein, to form a hybrid view of the vehicle. For example, the real-time view may include a blank space corresponding to a location of the surface underneath the vehicle, and the time-delayed view may be integrated into that blank space to form the hybrid view.

In some embodiments, the method 500 also includes step 512, where the processor and/or the vehicle camera system formats the hybrid view to include a first characteristic for the time-delayed view and a second, different characteristic for the real-time view. For example, the real-time view may be displayed in color and the time-delayed view may be displayed in black and white. The method 500 further includes step 514, where the processor and/or the vehicle camera system provides the hybrid view to a vehicle display (such as, e.g., the display 430 shown in FIG. 4) for display thereon.

In some embodiments, the method 500 further includes step 516, where the processor and/or the vehicle camera system update the time-delayed view based on a new set of stored images retrieved from the memory (e.g., newly-captured image data). Also in some embodiments, the method 500 further includes step 516, where the processor and/or the vehicle camera system provides the updated time-delayed view to the vehicle display to replace the time-delayed view currently on display. The method 500 may end once the vehicle and/or the vehicle camera system is turned off.

In certain embodiments, the process descriptions or blocks in the figures, such as FIG. 5, can represent modules, segments, or portions of code which include one or more executable instructions for implementing specific logical functions or steps in the process. Any alternate implementations are included within the scope of the embodiments described herein, in which functions may be executed out of order from that shown or discussed, including substantially concurrently or in reverse order, depending on the functionality involved, as would be understood by those having ordinary skill in the art.

It should be emphasized that the above-described embodiments, particularly, any "preferred" embodiments, are possible examples of implementations, merely set forth for a clear understanding of the principles of the invention. Many variations and modifications may be made to the above-described embodiment(s) without substantially departing from the spirit and principles of the techniques described herein. All such modifications are intended to be included herein within the scope of this disclosure and protected by the following claims.

The invention claimed is:

1. A vehicle, comprising:
cameras;
a display; and
processors configured to:
generate, via the cameras, a real-time view of an area within a field of view surrounding the vehicle using currently-captured images, and a time-delayed view of a region outside the field of view using previously-captured images;
determine a vehicle movement status comprising yaw rate, longitudinal and lateral acceleration, pitch rate, and roll rate;
calibrate the display view based on the vehicle movement status; and
display the calibrated display view at the display, wherein the calibrated display view comprises a hybrid view of the real-time view and the time-delayed view such that the real-time view of the area within the field of view surrounding the vehicle using the currently-captured images and the time-delayed view of the region outside the field of view using the previously-captured images are displayed in different colors.

2. The vehicle of claim 1, further comprising the memory, wherein the memory is configured to store the currently-captured images as new previously-captured images, and the processors are further configured to update the time-delayed view once the new images are stored in the memory.

3. The vehicle of claim 1, wherein the region outside the field of view includes a road surface underneath the vehicle and the processors generate the time-delayed view by combining the previously-captured images that show the road surface underneath the vehicle.

4. The vehicle of claim 1, wherein the processors are further configured to generate the real-time view by combining the currently-captured images from each of the cameras, the real-time view including a blank space corresponding to the region outside the field of view.

5. The vehicle of claim 4, wherein the processors are further configured to generate the hybrid view by integrating the time-delayed view into the blank space of the real-time view.

6. The vehicle of claim 1, wherein the previously-captured images are images captured by the cameras at a point in time prior to capture of the currently-captured images.

7. The vehicle of claim 1, wherein the hybrid view includes a phantom line distinguishing the real-time view and the time-delayed view.

8. The vehicle of claim 1, wherein the hybrid view contains no demarcation between the supplemental view and the real-time view.

9. The vehicle of claim 1, wherein time-delayed view includes a user-selected vehicle image that is representative of the vehicle.

10. A method, comprising:
generating, via cameras, a real-time view of an area within a field of view surrounding a vehicle using currently-captured images, and a time-delayed view of a region outside the field of view using previously-captured images;
determining a vehicle movement status comprising yaw rate, longitudinal and lateral acceleration, pitch rate, and roll rate;
calibrating the display view based on the vehicle movement status; and
providing, to a vehicle display, a calibrated display view, wherein the calibrated display view comprises a hybrid view of the real-time view and the time-delayed view such that the real-time view of the area within the field of view surrounding the vehicle using the currently-captured images and the time-delayed view of the region outside the field of view using the previously-captured images are displayed in different colors.

11. The method of claim 10, wherein the real-time view includes blank space corresponding to a location of the surface underneath the vehicle.

12. The method of claim 11, wherein combining the time-delayed view with the real-time images includes integrating the time-delayed view into the blank space of the real-time view to form the hybrid view.

13. The method of claim 11, further comprising formatting the hybrid view to include a first characteristic for the time-delayed view and a second, different characteristic for the real-time view.

14. The method of claim 13, wherein the real-time view is displayed in color and the time-delayed view is displayed in black and white.

15. The method of claim 10, further comprising:
updating, by the processor, the time-delayed view based on a new set of stored images retrieved from the memory; and
providing the updated time-delayed view to the vehicle display to replace the time-delayed view currently on display.

16. The method of claim 10, wherein the stored images are images captured by the cameras at a point in time prior to capture of the real-time images.

17. A vehicle camera system, comprising:
a plurality of cameras configured to capture images within a field of view surrounding a vehicle;
a processor configured to:
generate a real-time view of an area within the field of view using currently-captured images, a time-delayed view of a region outside the field of view using previously-captured images stored in memory;
determine a vehicle movement status comprising yaw rate, longitudinal and lateral acceleration, pitch rate, and roll rate;
calibrate the display view based on the vehicle movement status; and
provide, to a vehicle display, a calibrated display view, wherein the calibrated display view comprises a hybrid view of the vehicle by integrating the time-delayed view into the real-time view, wherein the hybrid view is generated such that the real-time view of the area within the field of view surrounding the vehicle using the currently-captured images and the time-delayed view of the region outside the field of view using the previously-captured images are displayed in different colors.

18. The vehicle camera system of claim 17, wherein the processor is further configured to generate the real-time view by combining the currently-captured images from each camera, the real-time view including a blank space corresponding to the region outside the field of view.

19. The vehicle camera system of claim 18, wherein the processor is further configured to integrate the time-delayed view into the blank space of the real-time view.

20. The vehicle camera system of claim 17, wherein the processor is further configured to format the hybrid view to include a first characteristic for the time-delayed view and a second, different characteristic for the real-time view.

21. The vehicle camera system of claim 17, the processor is further configured to update the time-delayed view once new images are stored in the memory.

22. The vehicle camera system of claim 17, wherein the region outside the field of view includes a road surface underneath the vehicle, and wherein the processor is further configured to generate the time-delayed view by combining the previously-captured images that show the road surface underneath the vehicle.

* * * * *